United States Patent
Qiu et al.

(10) Patent No.: US 11,245,582 B2
(45) Date of Patent: Feb. 8, 2022

(54) SELECTING RELAY FREQUENCIES IN A MOBILE REPEATER

(71) Applicant: Nextivity, Inc., San Diego, CA (US)

(72) Inventors: James Xiaohui Qiu, San Diego, CA (US); Johan Conroy, San Diego, CA (US); Michiel Petrus Lotter, San Diego, CA (US)

(73) Assignee: NEXTIVITY, INC., San Diego, CA (US)

( * ) Notice: Subject to any disclaimer, the term of this patent is extended or adjusted under 35 U.S.C. 154(b) by 0 days.

(21) Appl. No.: 16/012,104

(22) Filed: Jun. 19, 2018

(65) Prior Publication Data

US 2018/0375725 A1   Dec. 27, 2018

Related U.S. Application Data

(60) Provisional application No. 62/523,435, filed on Jun. 22, 2017.

(51) Int. Cl.
*H04W 24/02* (2009.01)
*H04L 12/24* (2006.01)
(Continued)

(52) U.S. Cl.
CPC ..... *H04L 41/0816* (2013.01); *H04B 7/15507* (2013.01); *H04B 7/15542* (2013.01); *H04W 24/02* (2013.01); *H04W 24/08* (2013.01)

(58) Field of Classification Search
CPC ............ H04B 7/15507; H04B 7/15542; H04L 41/0816; H04W 24/02; H04W 24/08
See application file for complete search history.

(56) References Cited

U.S. PATENT DOCUMENTS

| 2007/0243823 | A1 | 10/2007 | Oodachi et al. |
| 2013/0079049 | A1* | 3/2013 | Yu .................. H04W 48/16 455/524 |

(Continued)

FOREIGN PATENT DOCUMENTS

EP   3001579 A1   3/2016

OTHER PUBLICATIONS

International Search Report with Written Opinion corresponding to International Patent Application No. PCT/US2018/038251, dated Sep. 19, 2018, 13 pages.

*Primary Examiner* — Mansour Oveissi
(74) *Attorney, Agent, or Firm* — Kilpatrick Townsend & Stockton LLP

(57) ABSTRACT

A system includes a repeater and a data processor. The repeater is for relaying data between a base station and a handset. The repeater is configured to receive data from a plurality of cells in a network and relay at least a portion of the received data to a handset on a first channel. The data processor is coupled to the repeater. The data processor is configured to extract, from the received data, network information characterizing different channels in a network being utilized by neighbor cells. The data processor is configured to determine, from a set of supported channels that the repeater is capable of utilizing for relaying data and using the extracted network information, a set of monitor channels. The repeater is configured to monitor a channel characteristic of channels contained in the set of monitor channels. Related apparatus, systems, techniques and articles are also described.

19 Claims, 3 Drawing Sheets

(51) Int. Cl.
*H04B 7/155* (2006.01)
*H04W 24/08* (2009.01)

(56) References Cited

U.S. PATENT DOCUMENTS

| | | | |
|---|---|---|---|
| 2013/0165134 A1* | 6/2013 | Touag | H04W 16/14 455/452.1 |
| 2014/0341192 A1* | 11/2014 | Venkob | H04L 1/00 370/336 |
| 2017/0111161 A1* | 4/2017 | Raggio | H04W 72/042 |
| 2017/0359759 A1* | 12/2017 | Brown | H04W 36/0058 |
| 2019/0044639 A1* | 2/2019 | Ouchi | H04L 5/001 |

* cited by examiner

SELECTING RELAY FREQUENCIES IN A MOBILE REPEATER

CROSS REFERENCE TO RELATED APPLICATIONS

This application claims priority under 35 U.S.C. § 119 to U.S. Provisional patent application No. 62/523,435 filed Jun. 22, 2017, the entire contents of which is hereby expressly incorporated by reference herein.

TECHNICAL FIELD

The subject matter described herein relates to selecting relay frequencies in a mobile repeater.

BACKGROUND

When the number of bands a repeater can relay is fewer than the number of frequency bands supported by a mobile network, an algorithm is needed to instruct the repeater which frequency bands should be relayed. This process can be extremely difficult in mobile environments where cells and frequencies may be constantly changing due to signal fading conditions or changes in the frequencies deployed on a geographic basis.

SUMMARY

In an aspect, a system includes a repeater and a data processor. The repeater is for relaying data between a base station and a handset. The repeater is configured to receive data from a plurality of cells in a network and relay at least a portion of the received data to a handset on a first channel. The data processor is coupled to the repeater. The data processor is configured to extract, from the received data, network information characterizing different channels in a network being utilized by neighbor cells. The data processor is configured to determine, from a set of supported channels that the repeater is capable of utilizing for relaying data and using the extracted network information, a set of monitor channels. The repeater is configured to monitor a channel characteristic of channels contained in the set of monitor channels. The data processor is configured to reconfigure the repeater to relay the data signal on a second channel selected from the set of monitor channels, the reconfiguration in response to a change in the first channel.

One or more of the following features can be included in any feasible combination. The data processor can be configured to prioritize the monitored channels according to a priority determined based on the network information. The data processor can be configured to reduce the supported channel set such that the set of monitor channels include channels contained in both the supported channel set and channels having associated network information extracted from neighbor cell transmissions.

Monitoring channel characteristics can include: receiving data transmissions from neighboring cells; extracting, from the received data transmissions, network information for each neighbor cell; and ranking, according to a measure of quality and using the extracted network information for each neighbor cell, the channels utilized by the neighbor cells. Monitoring channel characteristics can include repeating the steps of the receiving of data transmissions from neighboring cells, the extracting network information for each neighbor cell, and the ranking.

Reconfiguring in response to the change in the first channel can include identifying that a signal strength and/or signal quality associated with the first channel is below a threshold. Monitoring channel characteristics can includes measuring a signal strength and/or signal quality of each of the channels contained in the set of monitor channels.

The network information can include cell selection criteria broadcast by the network to the handset or cell reselection criteria broadcast by the network.

The network information can includes global system for mobile communication (GSM) enhanced data rates for GSM evolution (EDGE) radio access network (GERAN) frequencies and/or GERAN neighbor cell frequencies contained within a system information block (SIB) message 7. The network information can include inter frequency neighbor information contained within system information block (SIB) message 5. The network information can include cell reselection priority and/or intrafrequency cell reselection information contained within a system information block (SIB) message 3. The network information can be broadcast from a base station for reception by the handset over a logical channel broadcast control channel (BCCH), transport channel broadcast channel (BCH), or downlink shared channel (DL-SCH).

In another aspect, a method includes: relaying, by a repeater, a data signal between a first base station and a handset; extracting, from the data signal, network information characterizing different channels in a network being utilized by neighbor cells; determining, from a set of supported channels that the repeater is capable of utilizing for relaying data, a set of monitor channels using the extracted network information; monitoring a channel characteristic of channels contained in the set of monitor channels; and reconfiguring the repeater in response to a change in the first channel and to relay the data signal on a second channel selected from the set of monitor channels.

One or more of the following features can be included in any feasible combination. For example, the method can include prioritizing the monitored channels according to a priority determined based on the network information. The method can include reducing the supported channel set such that the set of monitor channels include channels contained in both the supported channel set and channels having associated network information extracted from neighbor cell transmissions.

Monitoring channel characteristics can include: receiving data transmissions from neighboring cells; extracting, from the received data transmissions, network information for each neighbor cell; and ranking, according to a measure of quality and using the extracted network information for each neighbor cell, the channels utilized by the neighbor cells. Monitoring channel characteristics can include repeating the steps of the receiving of data transmissions from neighboring cells, the extracting network information for each neighbor cell, and the ranking.

Reconfiguring in response to the change in the first channel includes identifying that a signal strength and/or signal quality associated with the first channel is below a threshold.

The network information can include: global system for mobile communication (GSM) enhanced data rates for GSM evolution (EDGE) radio access network (GERAN) frequencies and/or GERAN neighbor cell frequencies contained within a system information block (SIB) message 7; inter frequency neighbor information contained within system information block (SIB) message 5; and/or cell reselection priority and/or intrafrequency cell reselection information contained within a system information block (SIB) message 3. The network information can be broadcast from a base station for reception by the handset over a logical channel broadcast control channel (BCCH), transport channel broadcast channel (BCH), or downlink shared channel (DL-SCH).

The current subject matter includes a repeater system where the set of possible channels to boost is reduced from a larger superset to a smaller viable set by reading neighbor cell information transmitted by the network. This information can be contained, for example, in SIB3, SIB5 or SIB7 of an LTE network. Instead of monitoring all possible frequencies that might be boosted, the current subject matter can monitor only the frequencies provided by the neighbor cell list. This can significantly increase the speed at which a repeater can find the appropriate set of frequencies to be repeated.

In another aspect, a system includes a repeater and a data processor. The repeater us for relaying data between a base station and a handset. The repeater is configured to receive data from a plurality of cells in a network and relay at least a portion of the received data to a handset on a first channel. The data processor is coupled to the repeater. The data processor is configured to extract, from the received data, network information characterizing a priority of different channels in a network being utilized by neighbor cells. The data processor is configured to determine, from a set of supported channels that the repeater is capable of utilizing for relaying data, a set of monitor channels by reducing the set of supported channels using the extracted network information. The repeater is configured to monitor a channel characteristic of channels contained in the set of monitor channels. The data processor is configured to reconfiguring the repeater in response to a change in the first channel and to relay the data signal on a second channel selected from the set of monitor channels.

In another aspect, a data signal is relayed by a repeater and between a first base station and a handset. Network information characterizing a priority of different channels in a network being utilized by neighbor cells is extracted from the data signal. A set of monitor channels is determined from a set of supported channels that the repeater is capable of utilizing for relaying data. The set of monitor channels determined by reducing the set of supported channels using the extracted network information. A channel characteristic of channels contained in the set of monitor channels is monitored. The repeater is reconfigured in response to a change in the first channel and to relay the data signal on a second channel selected from the set of monitor channels.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A need exists for a method to dynamically monitor and select the frequencies to be relayed in a mobile repeater.

The current subject matter includes a repeater system where the set of possible channels to boost is reduced from a larger superset to a smaller viable set by reading neighbor cell information transmitted by the network. This information can be contained, for example, in SIB3, SIB5 or SIB7 of an LTE network as described in 3GPP 36.331. Instead of monitoring all possible frequencies that might be boosted, the current subject matter can monitor only the frequencies provided by the neighbor cell list. This can significantly increase the speed at which a repeater can find the appropriate set of frequencies to be repeated.

In some implementations, the system ranks the detected and monitored cells in a priority order that can be predetermined or dynamically determined. The repeater relay bands can be assigned (e.g., the repeater can be reconfigured) in order of priority to the frequencies on which cells were detected.

Figure 1:
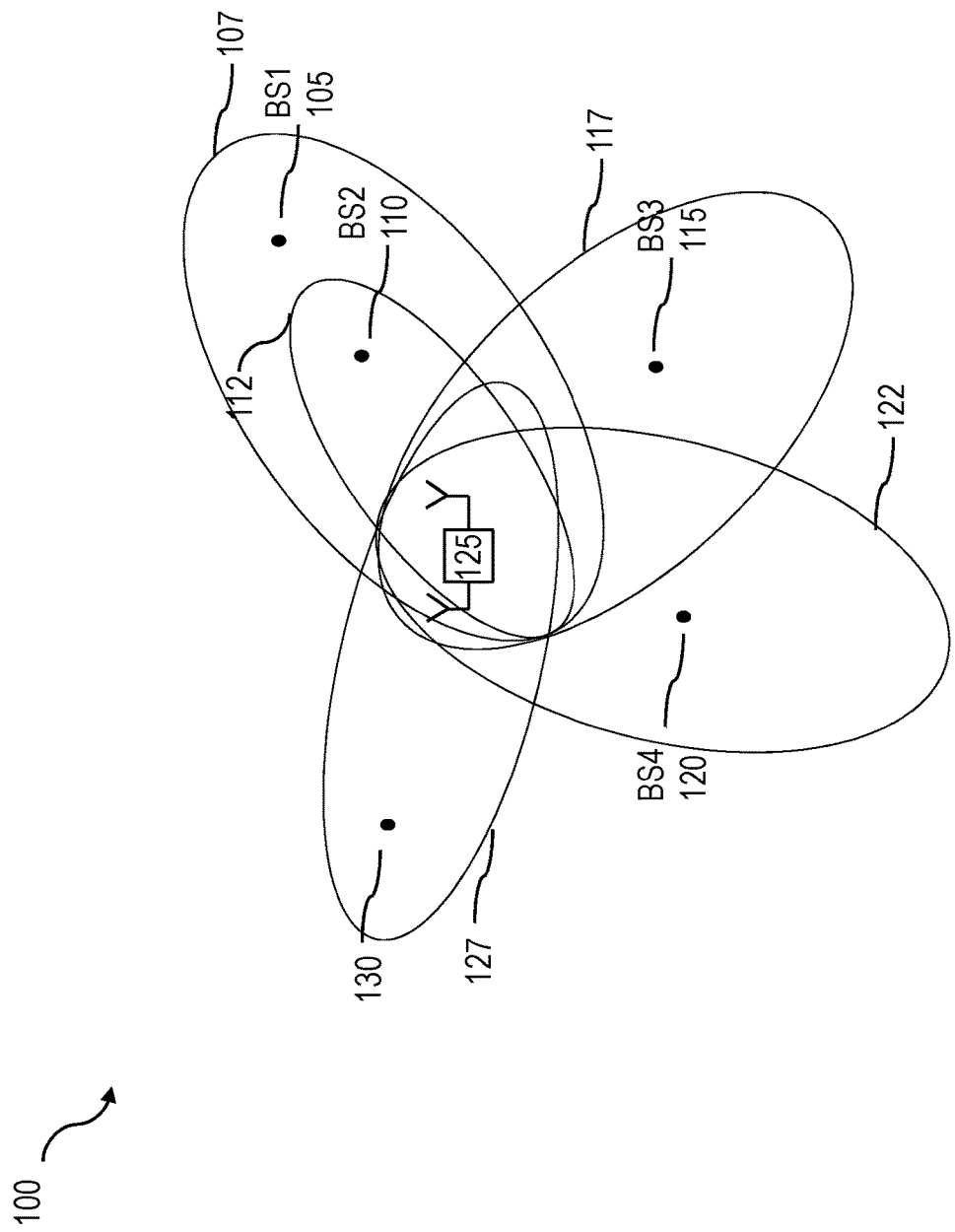
FIG. 1 is a system diagram of an example network.

FIG. 1 is a system diagram of an example network 100. The network 100 includes four base stations 105, 110, 115, 120, which in an LTE network can be referred to as an evolved nodeBs (eNodeBs). Each base station 105, 110, 115, and 120 has a respective cell coverage area 107, 112, 117, and 122. Each base station 105, 110, 115, and 120 can have a different operator and operating frequencies. A repeater 125 is within coverage areas 107, 112, 117, and 122 and is able to boost (e.g., relay) signals received from the base stations 105, 110, 115, 120. The repeater 125 can boost/relay signals within an associated repeater coverage area 127. A user equipment (UE) 130, also referred to as a handset, is within repeater coverage area 127 but not cell coverage areas 107, 112, 117, 122. Repeater 125 can connect UE 130 to one or more base stations 105, 110, 115, 120.

In operation, network information is broadcast by the network 100 (e.g., base stations 105, 110, 115, 120) to UE 130. The network information can include system information. System information is broadcasted by LTE eNodeBs over logical channel Broadcast Control Channel (BCCH). This logical channel information is further carried over transport channel Broadcast Channel (BCH) or carried by Downlink Shared Channel (DL-SCH). System information includes a Master Information Block (MIB), which is static, and System Information Block (SIB), which is dynamic. MIB carries information including channel bandwidth, PHICH configuration details; transmit power, no. of antennas and SIB scheduling information transmitted along with other information on the DL-SCH. SIB is mapped on RRC SI messages (SI-1,2,3,4,5,6,7,8,9,10,11) over DL-SCH and transmitted using PDSCH at periodic intervals.

SIBs are grouped in SI containers. Each SI is composed of multiple SIBs. Each SI usually has different transmission frequency and will be sent in a single sub-frame. SIBs are transmitted using BCCH mapped on DL-SCH which in turn mapped on PDSCH.

SIB3 carries cell re-selection information as well as Intra frequency cell re-selection information. SIB4 carries Intra Frequency Neighbors; carries serving cell and neighbor cell frequencies required for cell reselection as well handover between same RAT base stations (GSM BTS1 to GSM BTS2) and different RAT base stations (GSM to WCDMA or GSM to LTE or between WCDMA to LTE and the like). The contents of SIB3 are illustrated in table 1:

| LTE SIB-3 Information Elements | | |
|---|---|---|
| Cell Reselection Common Information | Qhyst Mobility State Parameters | Tevaluation T Hyst Normal N Cell Change Medium N Cell Change High |
| | Qhyst Scaling Factors | SF Medium SF High |
| Cell Reselection Serving Frequency Information Intra Frequency Cell Reselection Information | Snon-intrasearch Thresh Serving Low Cell Reselection Priority Qrxlevmin Pmax Sintrasearch Allowed Measurement Bandwidth Presence of Antenna Port 1 Neighbour Cell Configuration Treselection EUTRA | |
| | Treselection EUTRA Scaling Factors | SF Medium SF High |

SIB5 Carries Inter Frequency Neighbors (on a different frequency); carries E-UTRA LTE frequencies, other neighbor cell frequencies from other RATs. The purpose is cell reselection and handover. The contents of SIB5 is illustrated in table 2:

| LTE SIB-5 Information Elements | | |
|---|---|---|
| Inter-Frequency Carrier Frequency List (1 to 8 instances) | Downlink Carrier Frequency Qrxlevmin Pmax Treselection EUTRA | |
| | Treselection EUTRA Scaling Factors | SF Medium SF High |
| | Thresh X-High Thresh X-Low Allowed Measurement Bandwidth Presence Antenna Port 1 Priority Neighbour Cell Configuration QofsetFreq | |
| | Inter-Frequency Neighbour Cell List (1 to 16 instances) | Inter-Frequencey Neighbour Cell Information | Physical Cell Identity Qoffset |
| Inter-Frequency Black Cell List (1 to 16 instances) | Physical Cell Identity Range | Start Range |

SIB7 carries GSM neighbor information such as GERAN frequencies as well as GERAN neighbor cell frequencies. It can be used for cell re-selection as well as handover purpose. The contents of SIB7 is illustrated in table 3:

| LTE SIB-7 Information Elements | | |
|---|---|---|
| Treselection GERAN Treselection GERAN Scaling Factors | Medium Mobility High Mobility | |
| Carrier Frequencies Information List (1 to 16 instances) | Carrier Frequencies | Starting ARFCN Band Indicator Choice 1. Explicit List of ARFCN 2. Equally Spaced ARFCN Spacing ARFCN Number of ARFCN 3. Bit Map of ARFCN |
| | Priority NCC Permitted Qrxlevmin Pmax Thresh X-High Thresh X-Low | |

Additional information may be found in described in 3GPP 36.331.

Figure 2:
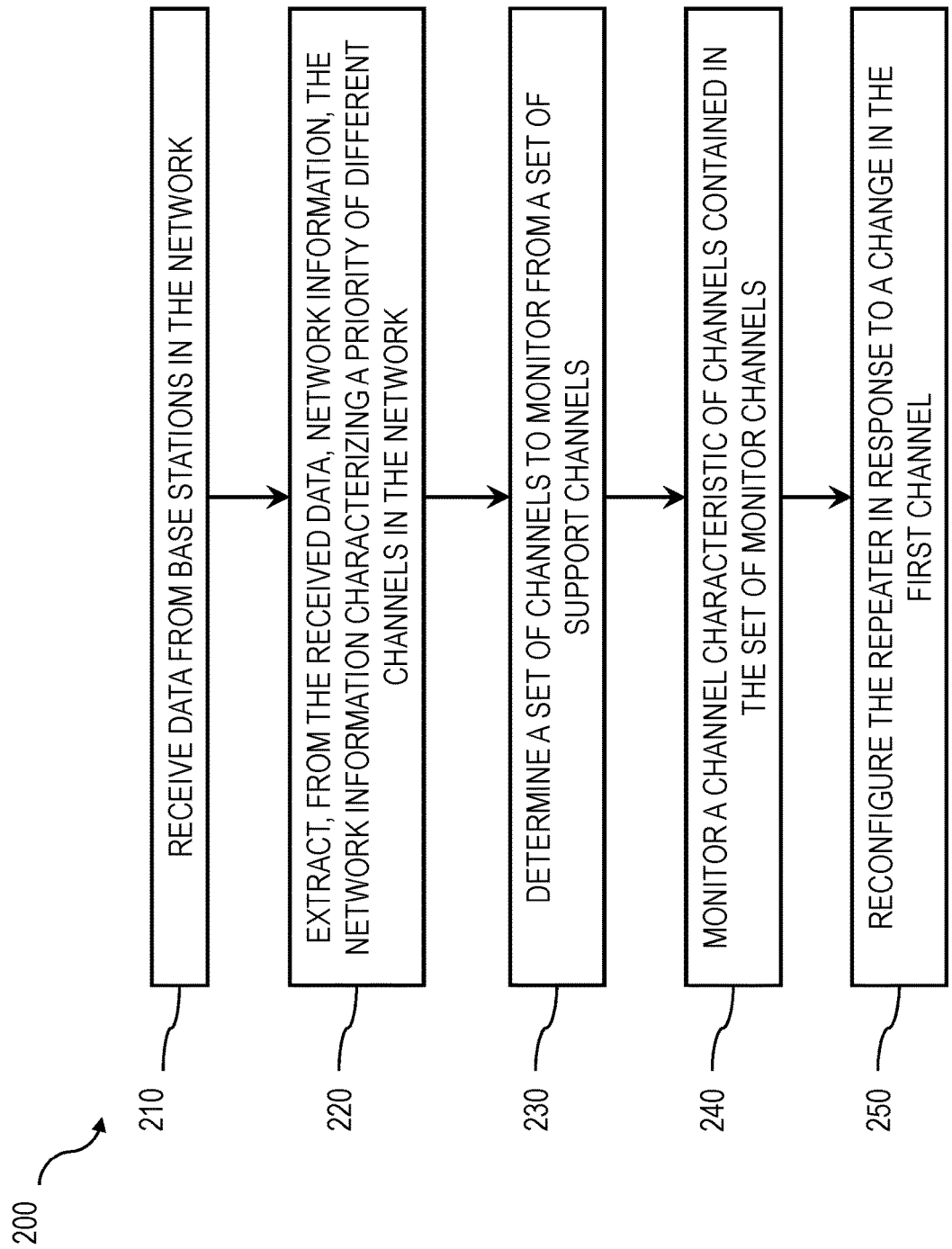
FIG. 2 is a process flow diagram illustrating an example process for a repeater to dynamically select a channel to relay.

FIG. 2 is a process flow diagram illustrating an example process 200 for a repeater 125 to dynamically select a channel to relay. The example process 200 can, in some implementations, enable determination of which frequency bands should be relayed in mobile environments where cells and frequencies may be constantly changing due to signal fading conditions or changes in the frequencies deployed on a geographic basis.

At 210, a repeater 125 can receive data from base stations (e.g., base stations 105, 110, 115, 120) in the network 100. The data can be transmitted for a handset (e.g., UE 130) and can include system information. The system information can include, for example, a Master Information Block (MIB), which is static, and System Information Block (SIB), which is dynamic. MIB carries information including channel bandwidth, PHICH configuration details; transmit power, number of antennas and SIB scheduling information transmitted along with other information on the DL-SCH. SIB is mapped on RRC SI messages (SI-1,2,3,4,5,6,7,8,9,10,11) over DL-SCH and transmitted using PDSCH at periodic intervals. A portion of the data (e.g., a data signal) can be relayed by the repeater to a handset.

At 220, the repeater 125 can extract, from the received data, network information including identification of channels utilized by neighbor cells. The network information can characterize a priority of different channels in the network. For example, in an LTE network, the network information can include information contained in SIB3, SIB5 or SIB7. The network information can have been determined by a base station. In some implementations, the network information is determined from another component of the telecommunications network. Network information can be extracted for some or all cells that the repeater can receive and transmit.

In some implementations, the repeater can extract network criteria from the system information intended for the handset. For example the extraction of network criteria can include inspecting and/or identifying system information SI, which can have different transmission frequency and can be sent in a single sub-frame. The inspection can include identifying and/or inspecting, the PDSCH, DL-SCH, and BCCH to identify transmitted SIB s. The extraction of network criteria can include identifying the MIB.

At 230, a set of channels to monitor can be determined from a set of support channels. The set of support channels can be the channels that the repeater is capable of utilizing for relaying data. The set of support channels can be predetermined. The set of channels to monitor can be determined by reducing the set of support channels using the extracted neighbor cell information. For example, the Inter-Frequency Neighbor Cell List in SIB5 may be used to reduce a list of all frequencies deployed by an operator in a network to only the frequencies rolled out in the area where the repeater is being used at that particular point in time.

At 240, a channel characteristic of channels contained in the set of monitor channels can be monitored. The monitoring can include measuring a level of signal strength (for example RSCP and RSRP) as well as signal quality (Ec/Io and SNR or CINR).

In some implementations, monitoring channel characteristics can include receiving data transmissions from neighboring cells; extracting, from the received data transmissions, network information for each neighbor cell; and ranking, according to a measure of quality and using the extracted network information for each neighbor cell, the channels utilized by the neighbor cells. In some implementations, these steps of the receiving of data transmissions from neighboring cells, the extracting network information for each neighbor cell, and the ranking can be repeated over time to continually monitor neighbor cell channel characteristics.

In some implementations, monitoring channel characteristics can include measuring a signal strength and/or signal quality of each of the channels contained in the set of monitor channels.

At 250, the repeater can be reconfigured in response to a change in the first channel. The repeater can reconfigure to relay the data signal on a second data signal on a second channel that is selected from the set of monitor channels. In some implementations, the reconfiguration can be performed by accessing configuration information from a table stored on the repeater 125 or by receiving configuration information from the network.

In some implementations, the reconfiguring in response to the change in the first channel can include identifying that a signal strength and/or signal quality associated with the first channel is below a threshold. In some implementations, the repeater can reconfigure in response to a change in a monitored channel, for example, if the signal strength and/or quality increases when compared to the signal strength and/or quality of the first channel.

In some implementations, monitored channels can be ranked or prioritized according to a priority of the channel. This can be performed, for example, by using the CellReselectionPriority information for all cells that are being monitored. Once ranked, the highest priority channel can be selected for reconfiguring the repeater when there is a change in the first channel. In some implementations, the reconfiguration can assign available repeating resources to match the determined ranking. The assignment of available repeating resources can include reconfiguring the repeater to relay signals on a frequency associated with the determined ranking. For example, if a repeater can relay a single LTE channel, it would configure the relay channel to match the frequency containing the highest priority cell. As another example, if a repeater can relay two LTE channels, it can configure to relay the two channels to match the Ffrequencies contained in the two highest priority cells.

In some implementations, the repeater 125 can determine receive signal level and associated quality measurements. The associated quality measurements can include signal to noise ratio, average power from a reference signal (RSRP), receive signal strength indication (RSSI), Reference Signal Received Quality (RSRQ) (the ratio N×RSRP/(E-UTRA carrier RSSI), where N is the number of RB's of the E-UTRA carrier RSSI measurement bandwidth), and the like. Determination of the receive signal level and associated quality measurements can include measurement of these values and/or measurement of one or more related values by an RF transceiver of the repeater.

Figure 3:
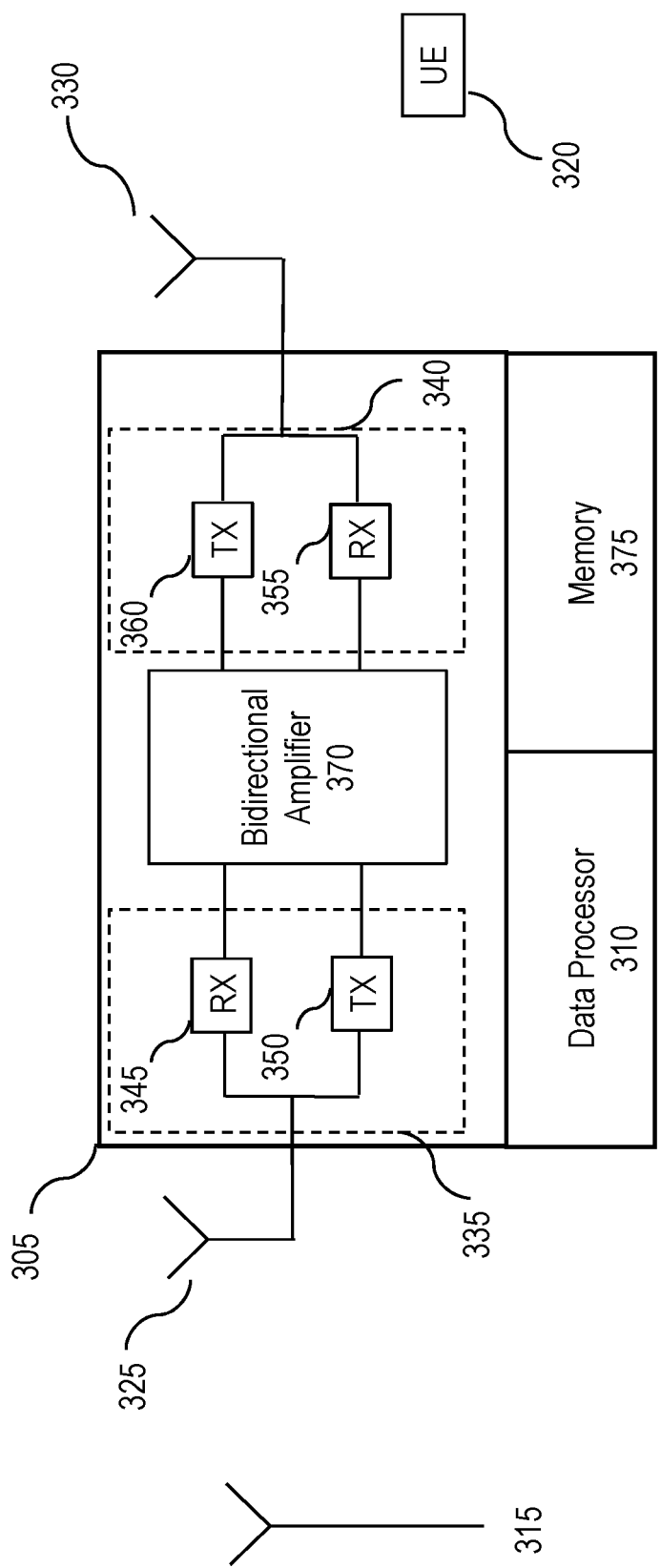
FIG. 3 is a system block diagram illustrating an example repeater coupled to a data processor and capable of repeating or relaying a data signal bi-directionally between a base station and handset.

FIG. 3 is a system block diagram illustrating an example repeater 305 coupled to a data processor 310 and capable of repeating or relaying a data signal bi-directionally between a base station 315 and handset 320. The repeater 305 includes a donor antenna 325 for communicating with the base station 315 and a server antenna 330 for communicating with the handset 320. The repeater 305 includes transceivers 335, 340 connected respectively to the donor antenna 325 and server antenna 330. Transceivers 335, 340 includes receivers 345, 355 and transmitters 350, 360, respectively. Transceivers 335, 340 are coupled via a bi-directional amplifier 370.

Data processor 310 is coupled to the repeater 305 and memory 375 storing configuration files. These configuration files can specify repeater settings or parameters at which to operate the repeater 305 in order to relay signals over different channels (e.g., frequency bands).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    a repeater for relaying data between a base station and a handset, the repeater comprising a donor antenna for communicating with the base station and a server antenna for communicating with the handset, each of the donor antenna and the server antenna having a transceiver for transmitting or receiving the data, the repeater configured to receive data from a plurality of cells in a network and relay at least a portion of the received data to the handset on a first channel; and
    a data processor coupled to the repeater, the data processor configured to extract, from the received data, network information characterizing different channels in a network being utilized by a plurality of neighbor cells, the data processor configured to determine, from a set of supported channels that the repeater is capable of utilizing for relaying data and using the extracted network information including a neighbor cell list providing frequencies of channels utilized by the plurality of neighbor cells, a set of monitor channels including only frequencies provided by the neighbor cell list;
    wherein the repeater is configured to monitor a channel characteristic of channels contained in the set of monitor channels;
    wherein the data processor is configured to reconfigure the repeater to relay the data signal on a second channel selected from the set of monitor channels, the reconfiguration in response to a change in the first channel based at least in part on the channel characteristic of the channels contained in the set of monitor channels;
    wherein a number of bands the repeater can relay is fewer than a number of frequency bands supported by the network; and
    wherein the network information includes at least one of cell selection criteria broadcast by the network to the handset and cell reselection criteria broadcast by the network.

2. The system of claim 1, wherein the data processor is configured to prioritize the monitored channels according to a priority determined based on the network information.

3. The system of claim 1, wherein the data processor is configured to reduce the supported channel set such that the set of monitor channels include channels contained in both the supported channel set and channels having associated network information extracted from neighbor cell transmissions.

4. The system of claim 1, wherein monitoring channel characteristics includes:
    receiving data transmissions from neighboring cells;
    extracting, from the received data transmissions, network information for each neighbor cell; and
    ranking, according to a measure of quality and using the extracted network information for each neighbor cell, the channels utilized by the neighbor cells.

5. The system of claim 4, wherein monitoring channel characteristics includes repeating the steps of the receiving of data transmissions from neighboring cells, the extracting network information for each neighbor cell, and the ranking.

6. The system of claim 1, wherein reconfiguring in response to the change in the first channel includes identifying that a signal strength and/or signal quality associated with the first channel is below a threshold.

7. The system of claim 1, wherein monitoring channel characteristics includes measuring a signal strength and/or signal quality of each of the channels contained in the set of monitor channels.

8. The system of claim 1, wherein the network information includes global system for mobile communication (GSM) enhanced data rates for GSM evolution (EDGE) radio access network (GERAN) frequencies and/or GERAN neighbor cell frequencies contained within a system information block (SIB) message 7.

9. The system of claim 1, wherein the network information includes inter frequency neighbor information contained within system information block (SIB) message 5.

10. The system of claim 1, wherein the network information includes cell reselection priority and/or intrafrequency cell reselection information contained within a system information block (SIB) message 3.

11. The system of claim 1, wherein the network information is broadcast from a base station for reception by the handset over a logical channel broadcast control channel (BCCH), transport channel broadcast channel (BCH), or downlink shared channel (DL-SCH).

12. A method comprising:
relaying, by a repeater, a data signal between a first base station and a handset on a first channel, the repeater comprising a donor antenna for communicating with the base station and a server antenna for communicating with the handset, each of the donor antenna and the server antenna having a transceiver for transmitting or receiving the data;
extracting, from the data signal, network information characterizing different channels in a network being utilized by a plurality of neighbor cells;
determining, from a set of supported channels that the repeater is capable of utilizing for relaying data and using the network information including a neighbor cell list providing frequencies of channels utilized by the plurality of neighbor cells, a set of monitor channels including only frequencies provided by the neighbor cell list;
monitoring a channel characteristic of channels contained in the set of monitor channels; and
reconfiguring the repeater in response to a change in the first channel and to relay the data signal on a second channel selected from the set of monitor channels based at least in part on the channel characteristic of the channels contained in the set of monitor channels,
wherein a number of bands the repeater can relay is fewer than a number of frequency bands supported by the network, and
wherein the network information includes at least one of cell selection criteria broadcast by the network to the handset and cell reselection criteria broadcast by the network.

13. The method of claim 12, further comprising prioritizing the monitored channels according to a priority determined based on the network information.

14. The method of claim 12, further comprising reducing the supported channel set such that the set of monitor channels include channels contained in both the supported channel set and channels having associated network information extracted from neighbor cell transmissions.

15. The method of claim 12, wherein monitoring channel characteristics includes:
receiving data transmissions from neighboring cells;
extracting, from the received data transmissions, network information for each neighbor cell; and
ranking, according to a measure of quality and using the extracted network information for each neighbor cell, the channels utilized by the neighbor cells.

16. The method of claim 15, wherein monitoring channel characteristics includes repeating the steps of the receiving of data transmissions from neighboring cells, the extracting network information for each neighbor cell, and the ranking.

17. The method of claim 12, wherein reconfiguring in response to the change in the first channel includes identifying that a signal strength and/or signal quality associated with the first channel is below a threshold.

18. The method of claim 12, wherein the network information includes:
global system for mobile communication (GSM) enhanced data rates for GSM evolution (EDGE) radio access network (GERAN) frequencies and/or GERAN neighbor cell frequencies contained within a system information block (SIB) message 7;
inter frequency neighbor information contained within system information block (SIB) message 5; and/or
cell reselection priority and/or intrafrequency cell reselection information contained within a system information block (SIB) message 3.

19. The method of claim 12, wherein the network information is broadcast from a base station for reception by the handset over a logical channel broadcast control channel (BCCH), transport channel broadcast channel (BCH), or downlink shared channel (DL-SCH).

* * * * *